United States Patent
Salqvist

(10) Patent No.: US 9,572,010 B2
(45) Date of Patent: Feb. 14, 2017

(54) METHOD AND SYSTEM FOR ROAMING OF A MOBILE COMMUNICATIONS UNIT

(71) Applicant: GlobeTouch AB, Stockholm (SE)

(72) Inventor: Fredrik Salqvist, Osterskar (SE)

(73) Assignee: GLOBETOUCH AB, Stockholm (SE)

( * ) Notice: Subject to any disclaimer, the term of this patent is extended or adjusted under 35 U.S.C. 154(b) by 0 days.

(21) Appl. No.: 14/653,646

(22) PCT Filed: Dec. 3, 2013

(86) PCT No.: PCT/SE2013/051437
§ 371 (c)(1),
(2) Date: Jun. 18, 2015

(87) PCT Pub. No.: WO2014/098722
PCT Pub. Date: Jun. 26, 2014

(65) Prior Publication Data
US 2015/0350997 A1    Dec. 3, 2015

(30) Foreign Application Priority Data
Dec. 21, 2012 (SE) ...................... 1251502

(51) Int. Cl.
*H04W 4/00* (2009.01)
*H04W 8/02* (2009.01)
(Continued)

(52) U.S. Cl.
CPC ............... *H04W 8/02* (2013.01); *H04L 65/40* (2013.01); *H04W 8/18* (2013.01); *H04W 40/02* (2013.01); *H04W 8/183* (2013.01)

(58) Field of Classification Search
CPC .......... H04W 8/02; H04W 40/02; H04W 8/18; H04W 8/183; H04L 65/40
(Continued)

(56) References Cited

U.S. PATENT DOCUMENTS 6,738,622 B1    5/2004 Stadelmann et al.
2005/0192007 A1  9/2005 Kumar et al.
(Continued)

FOREIGN PATENT DOCUMENTS

EP    2144458 A1    1/2010
WO    0176188 A2    10/2001
(Continued)

OTHER PUBLICATIONS

International Search Report dated Apr. 15, 2014, in PCT application.

*Primary Examiner* — Amancio Gonzalez
(74) *Attorney, Agent, or Firm* — Young & Thompson

(57) ABSTRACT

Method for routing mobile phone signaling messages between different collaborating networks (20,30) including an STP (25,35) and at least two home networks (10,40) including an STP (16,36). A collaborating ITP (29,39) is connected to a collaborating STP (25,35), a home ITP (17,47) is connected to a home STP (16,46), and a central ITP (51) is connected to each ITP via a wide area network (6) which is not a PSTN. A visited country IMSI identifies a mobile subscriber as a subscriber to a collaborating network. A visited IMSI is associated with a home network in the central ITP. A signaling message, including the visited IMSI, is sent from a collaborating STP to the collaborating ITP, and is forwarded to the central ITP. The message is forwarded from the central ITP to a home ITP with which the visited IMSI is associated, and sent to the corresponding home STP.

14 Claims, 4 Drawing Sheets

(51) Int. Cl.
*H04L 29/06* (2006.01)
*H04W 40/02* (2009.01)
*H04W 8/18* (2009.01)

(58) Field of Classification Search
USPC ..................................................... 455/432.1
See application file for complete search history.

(56) References Cited

U.S. PATENT DOCUMENTS

| | | |
|---|---|---|
| 2010/0128685 A1 | 5/2010 | Jiang |
| 2010/0136967 A1 | 6/2010 | Du et al. |
| 2011/0039518 A1 | 2/2011 | Maria |
| 2012/0282891 A1 | 11/2012 | Mohammed et al. |

FOREIGN PATENT DOCUMENTS

| | | |
|---|---|---|
| WO | 2005081962 A2 | 9/2005 |
| WO | 2007132233 A2 | 11/2007 |
| WO | 2008057472 A1 | 5/2008 |
| WO | 2008103446 A2 | 8/2008 |
| WO | 2013002694 A1 | 1/2013 |

METHOD AND SYSTEM FOR ROAMING OF A MOBILE COMMUNICATIONS UNIT

BACKGROUND OF THE INVENTION

Field of the Invention

The present invention relates to a method and a system for roaming of a mobile communications unit between mobile communication networks in different countries.

Description of the Related Art

Presently, it is common for mobile operators to have national mobile communication networks, such as networks for mobile data and/or voice communication, for example GSM, GPRS, 3G, LTE, etc. When a mobile communication unit is brought outside of the coverage area of a certain network and into the coverage area of the network of another operator, conventional roaming gives rise to problems with high and unpredictable costs for data and/or voice communication.

These problems are especially common when it comes to mobile data traffic, where costs during roaming with variable tariffs can amount to more than 1000 times higher per data unit as compared to mobile data traffic in the home network. Many times there are no efficient ways of keeping track of the costs during a stay abroad or the like. As a consequence, a user risks unpleasant surprises regarding mobile data costs when returning from a stay within the coverage area of the network of a foreign operator.

EP2144458 describes a method using an interface means to provide a SIM card with information regarding available networks for data traffic as well as connection costs for said networks.

WO2007132233 describes a method for remotely configuring a mobile communications device, and for registering and authenticating users of such a device. Configuration data is received and converted by the device, and a configuration database is updated using the data. In one example, different Subscriber Identity Module (SIM) cards with different International Mobile Subscriber Identities (IMSI) can be tied to the same user account for roaming.

WO2005081962 describes a method for keeping costs down for voice communication when roaming, by establishing a corresponding Voice over IP (VoIP) call when requesting a voice call from a mobile unit over a cellular network.

WO2008103446 describes a method in which the IMSI of a SIM is associated with a local telephone number (MSISDN) when roaming, in order to enjoy local tariffs.

WO2001076188 describes a method in which a care of address is used with a mobile device when performing IP-based communication.

The international patent application PCT/SE2011/050886, which has not been published on the filing date of the present application, describes a method according to which a local IMSI is automatically distributed to a SIM card in a mobile device roaming into a visited country.

A drawback of this method is that it exposes the home operator to the risk of misconfiguration in partner networks. Such misconfiguration will lead to malfunction of the roaming function. Namely, the method relies upon that a location update request message from a roaming device is correctly routed from the local roaming partner, via a local PSTN operator and a home PSTN operator, to the home network. This in turn involves processing of the IMSI, for instance using a routine involving translating the IMSI into a so called Global Title number format, which can be understood correctly by the PSTN operators. In the case of a network with many roaming partners, different IMSI number ranges for different purposes, customer agreements and so forth, the risk for misconfiguration of the IMSI number conversion at one or several of the local roaming partners is non-negligible.

BRIEF SUMMARY OF THE INVENTION

The present invention solves the above described problems.

Furthermore, it would be desirable to achieve a price efficient mobile roaming system, by the use of which several parallel national mobile telephone operators could be provided access to low-cost data roaming for their respective subscribers, without having to achieve their own set of low-rate roaming agreements with a respective network of roaming partners. The present invention solves this problem by providing a distributed network capable of providing national mobile telephone operators access to an international roaming network for low-cost data roaming, the connection to which requires a minimum of changes in the home network infrastructure while allowing such national operator to use its own operation- and business support systems.

Thus, the invention relates to a method for routing mobile phone signaling messages between different mobile communication networks, where at least one collaborating network comprises a respective STP (Signal Transfer Point) and at least two home networks comprise a respective STP each, which method is characterized in that the method comprises the steps of a) connecting a respective collaborating ITP (Internet Transfer Point) to the STP of each respective collaborating network, connecting a respective home ITP to the STP of each respective home network, and providing a central ITP which is connected to each of the said other ITP:s via a wide area network which is not a PSTN (Public Switched Telephone Network); b) providing a visited country IMSI (International Mobile Subscriber Identity), identifying a mobile subscriber as a subscriber to a certain one of said collaborating networks; c) to the central ITP, providing an association between the visited country IMSI and one of the said home networks; d) sending a first signaling message from the STP of the certain one collaborating network to the respective collaborating ITP, which first signaling message comprises the visited country IMSI; e) forwarding the first signaling message from the collaborating ITP to the central ITP; f) forwarding the first signaling message from the central ITP to the respective home ITP connected to the STP of the home network with which the visited country IMSI is associated; and g) sending the first signaling message from the said home ITP to the STP of the said home network.

Further, the present invention relates to a distributed network system for routing mobile phone signaling messages between different mobile communication networks, where at least one collaborating network comprises a respective STP (Signal Transfer Point) and at least two home networks comprise a respective STP each, which system is characterized in that the system comprises a respective collaborating ITP (Internet Transfer Point) connected to the STP of each respective collaborating network, a respective home ITP connected to the STP of each respective home network and a central ITP connected to each of the said other ITP:s using a wide area network which is not a PSTN (Public Switched Telephone Network), in that the collaborating ITP connected to a certain one of the collaborating networks is arranged to forward, to the central ITP, a first signaling message, sent from the STP of the certain collaborating network to the said collaborating ITP and comprising a visited country IMSI (International Mobile Subscriber Identity) identifying a mobile subscriber as a subscriber to the certain collaborating network, in that the central ITP is arranged to in turn forward the first signaling message to the respective home ITP connected to the STP of a home network with which the visited country IMSI has previously been associated in the central ITP, and in that the said home ITP is arranged to then send the first signaling message to the STP of the said home network.

BRIEF DESCRIPTION OF THE DRAWINGS

In the following, the invention will be described in detail, with reference to the appended drawings, where.

DETAILED DESCRIPTION OF THE PREFERRED EMBODIMENTS

Figure 1:
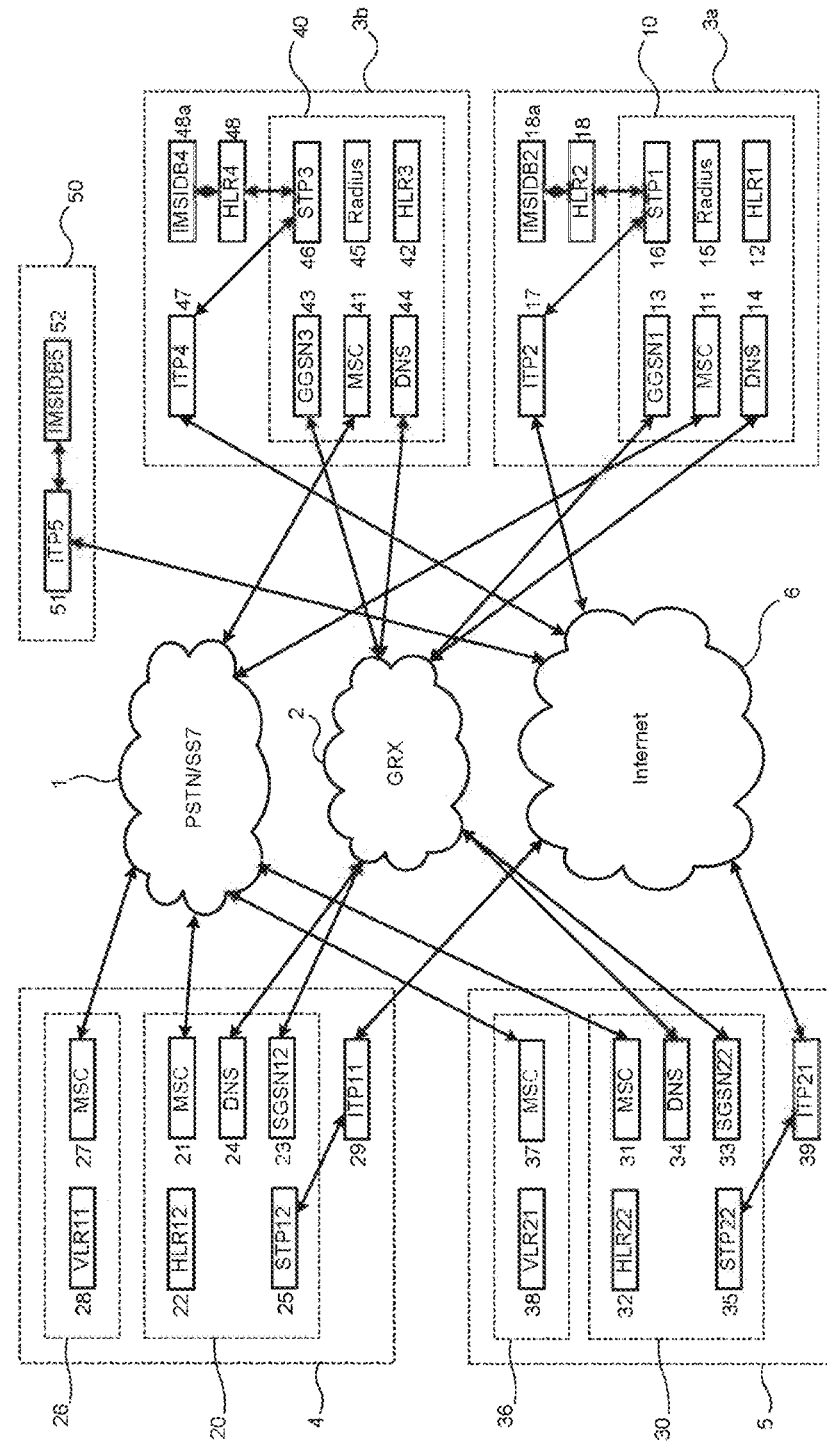
FIG. 1 is a simplified overview diagram of a system according to the present invention for use in a method according to the present invention.

All figures share reference numerals and annotations.

FIG. 1 illustrates a mobile communications network 10 which is a home network to a certain mobile communications device (not shown in FIG. 1). In other words, the mobile device is a subscriber to the home network 10. The home network 10 comprises a Mobile Switching Centre (MSC) 11, a Home Location Register (HLR) (HLR1) 12, a Gateway GPRS Support Node (GGSN) (GGSN1) 13, a Dynamic Name Server (DNS) function 14 which is conventional as such and a Remote Authentication Dial In User Service (RADIUS) server 15 which also is conventional as such. The home network 10 also comprises a Signal Transfer Point (STP) (STP1) 16, which is conventional as such and is arranged to transfer messages using the SS7 signaling protocol between the MSC 11 and entities external to the network 10.

The home network 10 can, however, be of any general type which is able to provide access to mobile communication services to the class of mobile devices which use Subscriber Identity Module (SIM) cards for network identification. In FIG. 1, the home network 10 is a GSM/GPRS network, but it is realized that other types of mobile communication networks in which a mobile communication device is identified using a SIM card are also possible to use with the present invention, such as a 3G and LTE network. The same is true regarding the below described foreign networks 20, 26, 30, 36. Correspondingly, the ITP:s (Internet Transfer Point) 17, 29, 39 are described (below) in the context of a GSM/GPRS system. However, when the invention is applied in a 3G or LTE network, the corresponding functionality as described can be arranged in corresponding appliances.

The home network 10 is operable within a home country 3a. The terms "home network" and "home country" are used simply to indicate a geographical location for the network 10, and does not imply a certain nationality of the mobile device user, an operator or such.

Another home network 40 in another, different, home country 3b is similar to home network 10 and also comprises corresponding components including an MSC 41, a HLR (HLR3) 42, A GGSN (GGSN3) 43, a DNS (44), a RADIUS server 45 and an STP (STP3) 46.

A mobile device can thus, when located in the home country 3a, connect to the home network 10 and hence obtain access to mobile communications services. The corresponding is true regarding home country 3b and home network 40. The mobile device can be of any suitable type, such as a mobile phone or a mobile data modem, and comprises a SIM card which is used to identify the mobile device to the network using an IMSI code.

Furthermore, the mobile device is capable of roaming from home network 10 or 40, to a first visited network 26 and a second visited network 36, both being similar to the home network 10 and to both of which the mobile device identifies itself using an IMSI code via its SIM card. The first visited network 26 is operable in a first visited country 4, which is different from the home country 3a. Similarly, the second visited network 36 is operable in a second visited country 5, different from both the home country 3a and the first visited country 4. The first visited network 26 comprises an MSC 27 and a VLR (VLR11) 28. The second visited network 36 comprises an MSC 37 and a VLR (VLR21) 38.

In the first visited country 4, a first collaborating network is also operable. Like the home network 10, the first collaborating network 20 comprises an MSC 21, a HLR (HLR12) 22, a DNS 24 and an STP (STP12) 25. The first collaborating network also comprises an SGSN (SGSN12) 23. As will become clear in the following, the operator of the first collaborating network 20 has beforehand entered into an agreement with the operator of the home network 10 concerning the provision of mobile communication services.

In a similar way, in the second visited country a second collaborating network 30 is also operable, comprising an MSC 31, a HLR (HLR22) 32 a DNS 34 and an STP (STP22) 35. The second collaborating network 30 also comprises an SGSN (SGSN22) 33. There is a similar agreement as to the provision of mobile communication services between the operator of the second collaborating network 30 and the operator of the home network 10. Preferably, these agreements are however entered into by a mutual agreement with an operator of the distributed network as described herein.

In practice, in each country, there may be several visited networks 26, 36 and several collaborating networks 20, 30 in the sense of the present invention. Furthermore, in any country a visited network 26, 36 may be the same as a collaborating network 20, 30. Also, a distributed network according to the present invention can be accessed by operators of several different home networks in several different home countries. Therefore, visited countries 4, 5 may be home countries for network 20, 30 operators. In this case, home countries 3a, 3b may be visited countries, and networks 10, 40 may be visited networks, for such operators.

According to the invention, at least one collaborating network 20, 30 comprises a respective STP 25, 35, and at least two home networks 10, 40 comprise a respective STP 16, 46 each.

A conventional PSTN 1 is set up for PSTN telephone signaling during roaming. Signaling takes place using a telephony signaling protocol, such as the SS7 protocol or any other suitable protocol, such as the SS7 extension SIGTRAN (SIGnaling TRANsport). PSTN 1 interconnects MSC:s 11, 21, 27, 31, 37, 41. Data traffic is routed via a GPRX Roaming Exchange (GRX) 2, interconnecting the GGSN:s 13, 43 and DNS:s 13, 14 with SGSN:s 23, 33 and DNS:s 24, 34.

The respective STP of both the home networks 10, 40 (STP1, STP3) and the collaborating networks 20, 30 (STP12, STP22) are arranged to communicate with a respective ITP (ITP2 17, ITP4 47, ITP11 29, ITP21 39, respectively). These ITP:s are not part of the respective network 10, 20, 30, 40, but are comprised in a distributed network according to the invention for conveying signaling traffic when a mobile device roams either between home network 10 and visited networks 20, 30 or between home network 40 and visited networks 20, 30. Each ITP is preferably arranged as a software function in a standalone server, and has its own SPC (Signaling Point Code), is arranged geographically close to its respective STP, preferably at least in the same country 3a, 3b, 4, 5, and they are interconnected for communication via a wide area network such as the Internet 6. The said distributed network also comprises for each home country 3a, 3b, a respective HLR (HLR2, HLR4) 18, 48, a respective control unit (CTRL2, CTRL4) 19, 49, arranged to keep track of all mobile devices roaming using the distributed network, including handling of IMSI ranges for different countries (see below), and a respective IMSI database (IMSIDB2, IMSIDB4) 18a, 48a.

Furthermore, the distributed network comprises a central ITP (ITP5) 51 and a central IMSI database (IMSIDB5) 52, arranged in a fifth country 50. The fifth country may be the same as any one of countries 3a, 3b, 4, 5. The central ITP 51 is also connected to the other ITP:s 17, 29, 39, 47 via the wide area network 6.

It is preferred that the distributed network is set up with one respective ITP 17, 29, 39, 47 in each respective country 3a, 3b, 4, 5, or at least in connection to each network 10, 20, 30, 40, and that all these ITP:s 17, 29, 39, 47 are connected to one and the same central ITP 51. Then, the network of any operator wanting to access the distributed network becomes a "home" network in the sense of the present invention, and at least one other connected network in each country apart from the "home" network country become "visited" networks.

Figure 2:
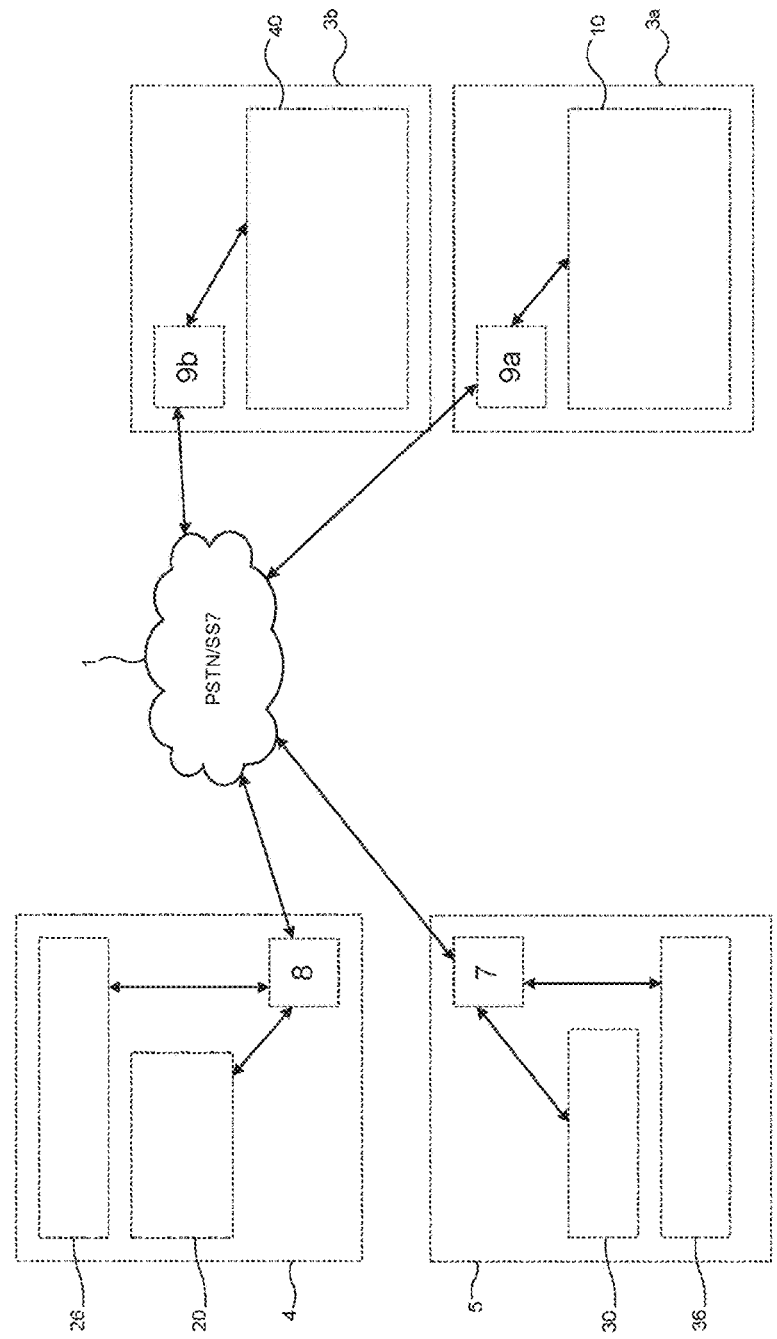
FIG. 2 is a simplified overview diagram similar to the one shown in FIG. 1, but only illustrating a prior art PSTN (Public Switched Telephone Network)

FIG. 2 illustrates how the PSTN 1 works. In each country 3b, 3a, 4, 5, a respective PSTN operator 7, 8, 9a, 9b is arranged, interconnected by the PSTN 1 for signaling over the SS7 protocol. Each PSTN operator 7, 8, 9a, 9b is then connected to the respective mobile telephone operators 10, 20, 26, 30, 36, 40 in each respective country 3a, 3b, 4, 5.

Conventionally, when a mobile phone with home network 10 roams to, for instance, network 20, there will be SS7 signaling messages between the VLR of network 20 and HLR1 12 in order to set up the mobile device for roaming voice and data access to network 20. In order for such SS7 messages to be routed to the correct recipient, the IMSI of the mobile device is commonly converted, such as using the so called Global Title convention. A numerical identifier in the form of a Global Title will be understood correctly by both SS7 message routing PSTN operators 8 and 9a. For instance, such number conversion may involve stripping the IMSI of a number of higher-order digits, and then adding the correct country and operator codes according to the Global Title.

Such conversion is prone to errors, since the conversion routine must be configured manually at each visited operator 20, 26, 30, 36.

The distributed network operator advantageously has a local presence in each visited country 4, 5, and therefore preferably has its own local IMSI series, comprising IMSI numbers which are local to each respective visited country 4, 5. A roaming mobile subscriber to a home network 10, 40 connected to the distributed network and roaming into country 4 or 5 then uses such local IMSI. A general method for automatically achieving that such local IMSI is used at all times is described in the above referred to international patent application PCT/SE2011/050886, and is also described below.

In order to allow the respective home network 10, 40 operator to keep control, and to use proprietary operation- and business support systems, when a subscriber mobile device roams, it is desirable to route signaling traffic back to the respective home network 10, 40, via the local roaming partner 20 or 30. Conventionally, this then involves translating the local IMSI into a correct Global Title, so that SS7 messages can be correctly routed to the home network 10, 40. In this case, each roaming partner needs to add configuration to translate the respective local IMSI range used by the MVNO in each respective visited country 4, 5 into a Global Title. A configuration error in a visited country 4, 5 may result in that a MVNO subscriber does not receive a connection.

The situation is further complicated when the distributed network operator wishes to collaborate with the home network 10, 40 of a domestic operator, using the mobile provisioning of the home network 10, 40 while keeping the control of the used IMSI ranges, billing, etc., in a way which is external to the home network 10, 40. In this case, the signaling must be routed further by the home network, to for instance HLR2 18 or HLR4 48.

The present invention solves this problem by instead of using signaling routing via the international PSTN network 1, routing signaling messages over the Internet. This way, no IMSI translation is necessary, why the above described configuration errors no longer constitute a threat. Furthermore, using a method according to the present invention, an operator of the distributed network according to the present invention can gain local presence in a range of countries 3a, 3b, 4, 5 by only having to arrange one ITP 17, 29, 39, 47 in each respective country 3a, 3b, 4, 5 and one central ITP 51. ITP:s 17, 29, 39, 47 can be made quite simple, keeping most of the logic in the central ITP 51, and costs can therefore be kept low.

As will become clear in the following, according to a preferred embodiment the respective ITP 17, 29, 39, 47 arranged in each of a plurality of countries 3a, 3b, 4, 5 is also arranged to forward all signaling messages received from one or several respective STP:s 16, 25, 35, 46 located in the same country, to the central ITP 51.

Figure 3:
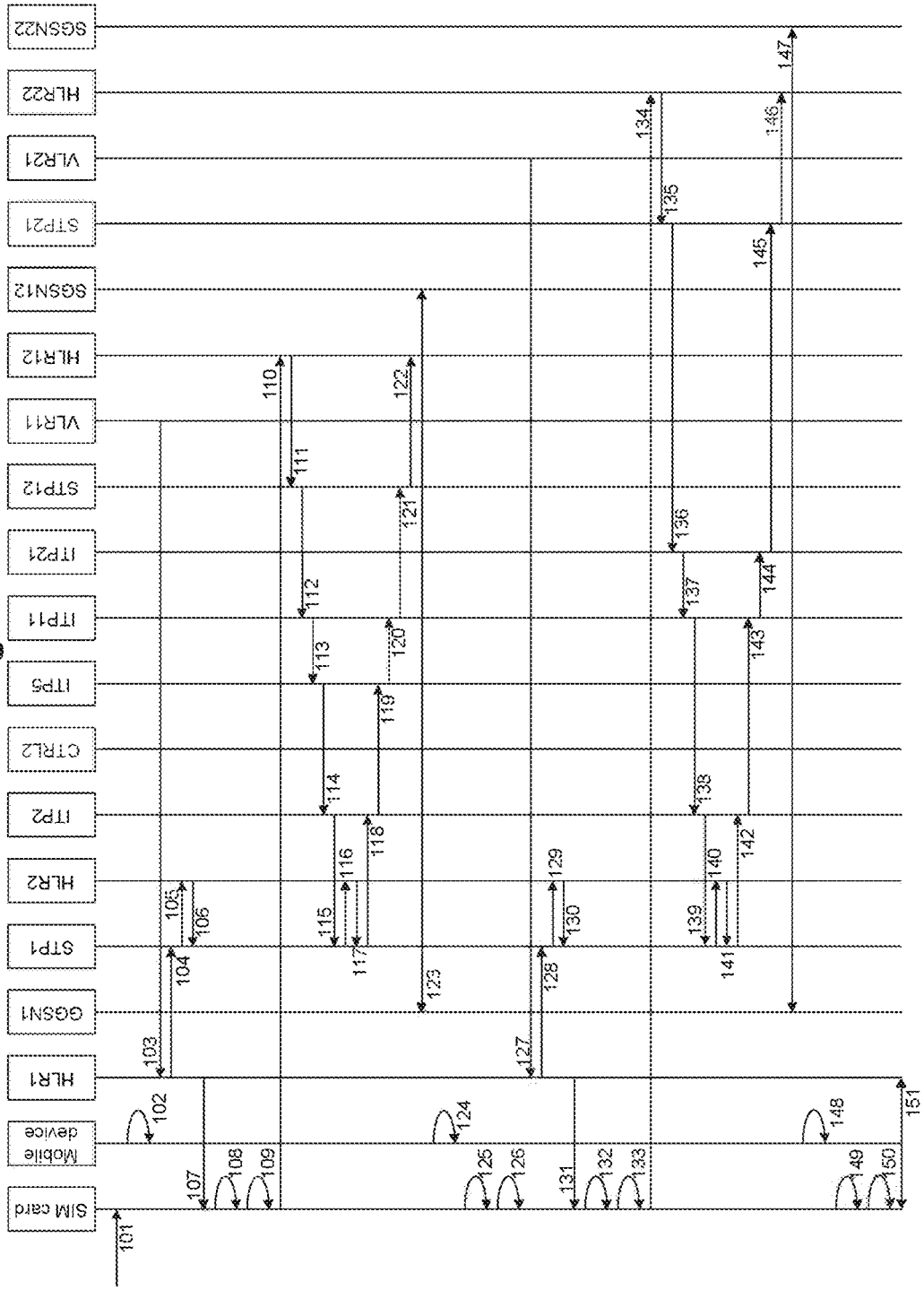
FIG. 3 is a flow chart of a method according to the present invention.

FIG. 3 illustrates, top down, the individual method steps of a method according to the present invention when the above described mobile communication device roams between the home network 10 in the home country 3a and visited networks 26, 36 in visited countries 4, 5.

In a first step 101, a home IMSI, associated with HLR1, is stored on the SIM card and used for network identification of the SIM card when the mobile device is within the coverage area of the home network 10 and thus provided access to mobile communication services by the home network 10. This step 101 can for example be taken in connection to the provision of the SIM card to the user of the mobile device, when setting up the subscription to the home network 10.

It is preferred that the said home IMSI is comprised in a predetermined range of IMSI codes domestic to country 3a that, in an initial step, the operator of network 10 and the operator of the distributed network have agreed upon, which IMSI codes are used by subscribers to the distributed network, and used for identification of SIM cards of such subscribers when located in country 3a.

In step 102, the mobile device roams from the home network 10 into the coverage area of the first visited network 26 in the first visited country 4. In other words, the mobile device is brought from the coverage area of the home network 10 to a position in the first visited country 4 within the coverage area of the first visited network 26 in which there is not sufficient network coverage of the home network 10.

This roaming event will, in a step 103, trigger the VLR11 28 of the first visited network 20 to send, over PSTN 1, a conventional location update message to the home network 10, which message is intercepted by the HLR1 12 of the home network 10. The location update message includes information about what visited network the VLR11 28 is a part of, and thus indicates that the mobile device has moved from the coverage area of the home network 10 to the coverage area of the first visited network 26.

In steps 104, 105, the HLR1 12 forwards the location update information, via STP1 16, to HLR2 18. As described above, HLR2 18 is a part of the distributed network, and not part of network 10. Since the home IMSI is comprised in the predetermined range of domestic IMSI codes, HLR1 12 can lookup the IMSI contained in the location update, recognize it as the IMSI of a subscriber of the distributed network and based upon this IMSI information forward the location update message to HLR2 18.

HLR2 18 responds, in step 106, by sending another signaling message, to STP1 16, instructing the home network 10 to send, in a step 107, an instruction message over the air to the mobile device to change, from the home IMSI to a first visited country IMSI, the IMSI used for network identification of the SIM card.

The IMSI change instruction message can, for instance, be sent from HLR1 12 as an SMS which is received by the SIM card. It is preferred that the provision of the first visited country IMSI to the mobile device is fully automatic and does not involve any specific action on the part of the user of the mobile device.

The first visited country IMSI is selected by the HLR2 18 from a list of available IMSI codes for the first visited country 4, see below. Furthermore, the first visited country IMSI is associated with the HLR12 22 of the first collaborating network 20. In other words, the first visited country IMSI identifies a mobile subscriber as a subscriber to the first collaborating network 20. For instance, the collaborating network 20 may be identified by the combination of the MCC (Mobile Country Code) and the MNC (Mobile Network Code) of the IMSI.

In a step 108, carried out in response to the said IMSI change instruction message, the mobile device stores the received first visited country IMSI on the SIM card and uses it for network identification of the SIM card. In addition thereto, the mobile device saves the home IMSI originally used for network identification for later use.

Then, in a step 109, the mobile device performs a device network refresh. This is a locally performed action essentially equivalent to switching the mobile device, or the network connection, off and then on again. In practice the network refresh may be in the form of a SIMOTA refresh or, preferably, a SIMOTA reset. This will cause the mobile device to initiate a location update procedure 110 by sending a location update request message to HLR12 22, comprising the first visited country IMSI. According to the invention, the mobile device is caused to send such a message when located within the coverage area of the first collaboration network 20 in the first visited country 4. It is realized that this may be achieved in other ways than by performing a network refresh, such as by manually switching the mobile phone on from a switched off state.

That the "mobile device" receives the message from the HLR1 12 in step 107, updates the IMSI in step 108 and performs the device network refresh in step 109 is to be interpreted so that any functional software and/or hardware part of the mobile device is responsible for conducting these and other such tasks. According to a preferred embodiment, which is illustrated in FIG. 3, it is the SIM card which, being a part of the mobile device when installed therein, conducts the above tasks. The corresponding is true regarding steps 126, 127, 133, 134, 151 and 152, below.

After the device network refresh, the mobile device will be connected to the HLR12 22 of the first collaborating network 20, since the SIM card identifies itself using the first visited country IMSI, being associated with the HLR12 22. In other words, after the device network refresh, the mobile device wakes up in the role of a local mobile subscriber to the first collaborating network 20. As a consequence, the connection to the first visited network 26 will only be temporary, fulfilling the purpose of identifying in the home network 10 and HLR2 18 the roaming action of the mobile device to the first visited country 4. Note that in the case where the first visited 26 and the first collaborating 20 networks are actually the same, the first visited country IMSI will be local to the first visited network 26, and apart from this the invention is analogously applied.

According to the invention, a signaling message is then sent from the STP12 25 of the first collaborating network 20 to the ITP11 29, comprising the visited country IMSI now used by the SIM card. Preferably, the signaling message is a location update message the sending of which is triggered by said location update procedure initiated by the mobile device, and based upon the first visited country IMSI comprised in a location update message received. This sending takes place in a step 112, after the HLR12 22 has sent the location update information to the STP12 25 in a step 111.

The ITP11 29, in turn, in a step 113 forwards the location update message to the ITP5 51, using the Internet 6 and without using the PSTN 1.

According to the invention, to the central ITP 51 is provided with a previously established association between the visited country IMSI and the home network 10. For instance, such an association between each visited country IMSI used by the distributed network and a respective home network 10, 50 of a national operator, which national operator is provided access to the distributed network, has been established and stored beforehand in a format available to the ITP5 51, such as in digital format in IMSIDB5 52.

According to a preferred embodiment, in each country 3a, 3b, 4, 5 in which the distributed network is arranged, an IMSI range, such as covering IMSI codes XXX YY 0000 000 000-XXX YY 9999 999 999, is provided, where XXX=MCC for the respective country 3a, 3b, 4, 5, and YY=MNC for the distributed network in each respective country 3a, 3b, 4, 5. At least some of the last 10 digits can be used for, within the distributed network, identifying the national operator which is provided access to the distributed network. The remaining digits may then be used as a pool of available IMSI codes available for use as local IMSI for roaming mobile devices when in a visited country. Thus, each visited network needs to add routing configuration so that all IMSI codes with the MCC of the visited network in question are associated to the HLR of the visited network in question. The IMSIDB 52 will comprise associations between each such IMSI code and a respective home network operated by the respective national operator as identified in the IMSI.

At least a subrange of the available IMSI range is also stored in IMSIDB2 18a and IMSIDB4 48a, in order for HLR2 18 and HLR4 48 to be able to assign local IMSI codes to roaming mobile devices.

Since the central ITP 51 has access to an association between the visited country IMSI now used and the home network 10, it can now, in a step 114, forward the message to the respective home ITP connected to the STP of the home network with which the visited country IMSI is associated, namely in this case ITP2 17.

Finally, in a step 115 the message is sent from ITP2 17 to the STP (STP1 16) of the home network 10.

It is preferred that a server comprising the HLR2 18 is connected to, but arranged externally to, the home network 10, which home network 10 then, in a step 116, forwards the message to the HLR2 18 based upon the visited country IMSI contained in the message.

It is preferred that all signaling traffic between various HLR:s, STP:s and ITP:s uses the SS7 signaling protocol or extensions thereof, such as the SIGTRAN protocol.

Two-way signaling then continues via ITP:s 17, 29 and STP:s 16, 25, over the Internet 6 instead of the PSTN 1, from HLR12 to HLR2 18 via steps 111-116, and also in the opposite direction via steps 117-122 as seen in FIG. 3.

Specifically, a second signaling message, also comprising the visited country IMSI, is sent, in step 117 from HLR2 18 to STP1 16, and then, in step 118, a corresponding signaling message, comprising said IMSI, is sent from STP1 16 to ITP2 17. This message is then, again, in a step 119 forwarded by ITP2 17 to the central ITP 51.

The ITP 51 can read the IMSI comprised in the message, and, based upon for instance the MCC/MNC combination comprised in the IMSI or a previously established and in IMSIDB 52 stored association between each visited country IMSI and a certain ITP, determine to which visited network 20 to route the message. The ITP5 51 is arranged to forward the message received from the home ITP 17 to the respective collaborating ITP 29 connected to the STP 25 of the collaborating network 20 to which the mobile subscriber is identified as a subscriber by the visited country IMSI. Hence, the message will be forwarded, in a step 120, to ITP11 29 in the visited country 4.

In a step 121, the message is then sent from ITP11 29 to STP12 25.

When so is needed, the message received by an STP 16, 25 is distributed to the corresponding MSC 11, 21, HLR 12, 22 and/or to the mobile device.

Hence, the ITP devices 29, 39 arranged in both the visited countries 4, 5 and the ITP device 17 in the home country 3a can be made very simple, basically only forwarding all signaling traffic to the central ITP 51. The central ITP device 51 can also be made relatively simple, but must however have access to the IMSI-home network associations described above, for instance via database IMSIDB 52, and routing functionality for routing signaling messages to the correct ITP device 17, 29, 39 depending on the IMSI.

According to a preferred embodiment, the signaling in steps 111-122 is in the form of conventional SS7 or SIGTRAN messages, which are relayed over the Internet 6 rather than the PSTN 1. This way, existing SS7 and/or SIGTRAN equipment can be used in both networks 10 and 20, without any modifications other than routing signaling traffic relating to IMSI codes in the list of available IMSI codes for the first visited country 4 via ITP:s 17, 29 rather than via the conventional PSTN 1. At the same time, no IMSI number conversion is necessary, as described above. In fact, it is preferred that the first visited country IMSI is used as is, without modification.

Once contact has been established between HLR12 22 and MSC 11 via ITP2 17, ITP1 29 and ITP5 51, it is preferred that all signaling traffic is routed this way moving forward.

Hence, using the present invention it is possible to reduce the risk of misconfiguration while still using a conventional SS7 protocol and not having to build a separate SS7 network.

Furthermore, participating mobile operators can connect to a distributed network according to the invention, comprising a respective local ITP device in connection to each participating national mobile operator and a central ITP device, without any major modifications of existing infrastructure, gaining the advantages of the distributed network in terms of inexpensive data traffic for the subscribers.

Namely, it is preferred that the mobile device has previously stored an APN (Access Point Name) identifying GGSN1 13 in the home network 10. When the mobile device requires Internet access, it attempts to initiate a data connection using the said APN. DNS and RADIUS functions are provided by DNS 14, 24 and RADIUS 15, in a way which is conventional as such apart from the signaling taking place via ITP:s 17, 29, 51.

This signaling also takes place via ITP:s 17, 29, 51 and STP:s 16, 25 as described above, and results, in step 123, in the setting up of an Internet data connection to the mobile device via the GGSN1 13 and SGSN12 23 of the first collaborating network 20. In the exemplifying case of a GPRS system, the data traffic is routed via GRX 2 or alternatively an Internet tunnel. The existing DNS 14, 24 and RADIUS 15 functionality of networks 10, 20 can be used in the normal way.

It is specifically preferred that the Internet data (non-signaling) traffic is not routed via ITP:s 17, 29, 51, since using GRX 2 and the existing infrastructure of networks 10, 20 results in low costs, and that the home network 10 operator can use existing operation- and business support systems, which is preferred. Examples include systems for surveillance, control and billing. In other words, when the home network 10 joins the distributed network, the experience of a subscriber to the home network 10 does not change significantly in terms of the interface to the operator, apart from the fact that the subscriber may need to install a new SIM card in the mobile device and that roaming can become much less expensive. Also, the infrastructure of the home network 10 operator can be maintained without any major modifications.

It is preferred that the data communications of the mobile device terminate at the home network 10 and that it is the GGSN1 13 of the home network 10 that provides the final Internet connection to the mobile device.

According to one important aspect of the current invention, the mobile device is not provisioned with voice functionality when roaming to collaborating networks 20, 30, but only to signaling itself and data services, such as an Internet connection. The reason for this is that the signaling over the Internet 6 instead of the conventional PSTN 1 will not easily work with voice traffic, but will, for data only type mobile subscriptions work better than according to the prior art.

In this case, it is preferred that all of the visited country IMSI codes described herein, such as all IMSI codes used by the mobile device using a system according to the present invention except possibly the home IMSI, are associated with a setting in the respective HLR 12, 22, 32, 42 with which the IMSI in question is associated making available data communication but not voice communication when roaming.

Furthermore, it is in this case preferred that the data communication to and from the mobile device when being served by a collaborating network 20, 30 is in the form of Internet access.

In a step 124, the mobile device roams further, now from the coverage area of the first collaborating network 20 to the coverage area of the second visited network 36 in the second visited country 5.

The mobile device is arranged to by itself detect such roaming activity and take appropriate action. In FIG. 3 it is the SIM card which itself detects the roaming event and acts. Thus, as a consequence of the roaming event, the mobile device is arranged to, in a step 125, change the IMSI used for network identification of the SIM card back to the home IMSI, which was previously saved in step 108.

Thereafter, in a step 126, the mobile device again performs a device network refresh. This device network refresh command will, in a step 127, again result in a location update message being sent, now from the VLR21 38 of the second visited network 36 to the home network 10.

In steps 128 and 129, the HLR1 12 again forwards the location update information, via STP1 16, to HLR2 18, based on the IMSI contained in the location update. In the response 130 from HLR2 18, there is an instruction to the home network 10 to send, in a step 131, an instruction message over the air to the mobile device to change, from the home IMSI to a second visited country IMSI, the IMSI used for network identification of the SIM card.

Analogously to the first visited country IMSI, the second visited country IMSI is selected by the HLR2 18 from a list of available IMSI codes for the second visited country 5, see below.

As an alternative to steps 125, 126 and 127, the HLR1 12 may be equipped with means for detecting the roaming of the mobile device, which is at the time associated with the HLR12 22 of the first collaborating network 20, to the second visited network 36, for example via a message from the second visited network 36 or from the first collaborating network 20. Then, the method will directly proceed to step 127.

The reception of the instruction message from the HLR1 12 will, in a step 132 and similarly to step 108 above, result in the mobile device storing the second visited country IMSI on the SIM card and using it for network identification of the SIM card, while in addition thereto again saving the home IMSI for later use.

Then, similarly to step 109 above, in a step 133, the mobile device will perform a device network refresh.

In a step 134, the mobile device will then connect to the HLR22 32 of the second collaborating network 30 as a local subscriber. Then, signaling steps 135-146 will be performed over the Internet 6 instead of via PSTN 1, in a way which is analog to steps 111-122 as described above.

Then, in a step 147, data traffic resulting from use of the mobile device with its SIM card, and identified using the second visited country IMSI, is routed between the second collaborating network 30 and the home network 10, between the SGSN22 33 and the GGSN 13 using GRX 2.

What is said about the relationship between the first visited network 26, the first collaborating network 20 and the home network 10 is also generally applicable to the corresponding relationship between the second visited network 36, the second collaborating network 30 and the home network 10.

Also, when another network is used as the home network, such as home network 40 or even networks 20, 30, the corresponding applies as described herein from the viewpoint of network 10 being the home network. In this case, the network 10 may thus take the role of a collaborating network. When network 40 is the home network, HLR4 48, ITP4 47 and IMSIDB5 48a will assume the same role as HLR2 18, ITP2 17 and IMSIDB2 18a, respectively, assume when network 10 is the home network.

In order to avoid unnecessary location update messages, if the mobile device looses contact with the currently used collaborating network without having travelled to another country, it preferably does not change its IMSI back to the home IMSI. When the network connection is eventually again available while still located in the same country, the connection to the current collaborating network will still be valid.

If and when, however, the mobile device subsequently roams into the coverage areas of further respective mobile communication networks in another country than the current, for example back to the first visited network 20 in the first visited country 4, a corresponding routine will be followed as the one described in connection to steps 124-147, in which the mobile device reinstitutes the home IMSI for network identification, whereupon the currently visited network sends out a location update message to the HLR1 12, which in turn instructs the mobile device over the air to update its IMSI used for network identification to an IMSI which is specific to the currently visited country and an available collaborating network in that country. During all such roaming activities, the mobile device will thus always operate using a local IMSI in the country in which it is currently located, while saving the home IMSI for future use.

If there is no available collaborating network in a country into which the mobile device is roaming, it is preferred that communication services, at least data traffic, become unavailable for the mobile device while in that country.

When, in a step 148, the mobile device eventually roams back to the coverage area of the home network 10 in the home country 3, the mobile device as a reaction thereto, in a step 149, changes its IMSI used for network identification of the SIM card back to the home IMSI. Then, in a step 150, it performs a device network refresh. Steps 149 and 150 are thus similar to steps 125 and 126. Thereupon, the mobile device will again, in a step 151, connect to the HLR1 12 of the home network 10 as a local subscriber.

Using such a system and method, it is possible for the operator of the home network 10 to guarantee that the communication of a mobile user during roaming will always be using a local identity. As a consequence, relatively low costs can be charged for mobile communication, even when roaming. Still, the operator of the home network 10 maintains the control over the data traffic for its subscribers.

When roaming to visited networks from the home network or from another visited network, the change of IMSI to a new, local IMSI will be automatic and virtually immediate since the mobile device itself triggers the IMSI update sequence by reinstituting the original home IMSI upon roaming. Only a minimum of downtime, mainly to allow time for the device network refresh to become effective, will interrupt current communications. The present inventors have discovered that signaling via STP and ITP boxes is sufficiently fast and reliable for the purposes of data services.

By reverting back to the home IMSI, roaming chains are avoided. That is, if the home IMSI was not reinstituted and the device network refresh not performed by the mobile device, the collaborating network from which the mobile device was roaming to a visited network in another country would, since it considers the mobile device a local one, impart its normal roaming behavior, resulting in normal roaming costs etc.

Furthermore, since the home IMSI is always saved, the IMSI can be restored automatically and immediately when the mobile device returns back to the home network 10.

According to one preferred embodiment, at least one of the first, second or subsequent visited country IMSI codes are selected from the above described respective plurality of IMSI codes, associated with or comprised in the HLR2 18 and associated with the respective visited country where the respective visited country IMSI is used. Such a plurality of IMSI codes preferably contains less individual IMSI codes than the total number of users being served by the HLR1 12 and which are the subject of the present method. In other words, all users being subscribers to the home network 10 and who are served by the HLR1 12 will share a set of available visited country IMSI codes for each of the available visited countries, which set is smaller than the number of such users.

According to a preferred embodiment, the SIM card installed in the mobile device is provided with a software SIM card application, arranged to monitor in which country and possibly also in which network's coverage area the mobile device is currently located. Such monitoring is preferably carried out by reading the communication between the mobile phone and the network or networks to which the mobile device is currently connected or can connect. Preferably, the country codes present in available networks at the current location of the mobile device are read, and a change of such country codes from one country to another is interpreted as a roaming event of the mobile device. In other words, it is only upon an actual detected change of the current country that steps 125 and 149 are performed as described above.

Further in accordance with this embodiment, the said software application is arranged to perform the above described updating changes of the IMSI used for network identification and arranged to perform the above described device network refresh events. It is furthermore preferred that it is the software application which saves the home IMSI while in a visited network.

Using such a SIM card software application, a user of an existing mobile device can obtain access to more cost-efficient communications while roaming merely by replacing his or her existing SIM card for a new SIM card having the above described SIM card software application preinstalled. Alternatively, the SIM card software application may even be downloaded into an existing SIM card using the mobile network or otherwise, making the method even simpler for the user.

According to a preferred embodiment, the roaming functionality of the present invention is completely self-contained within the SIM card, rendering the installation and operation in a mobile device safe and simple.

Figure 4:
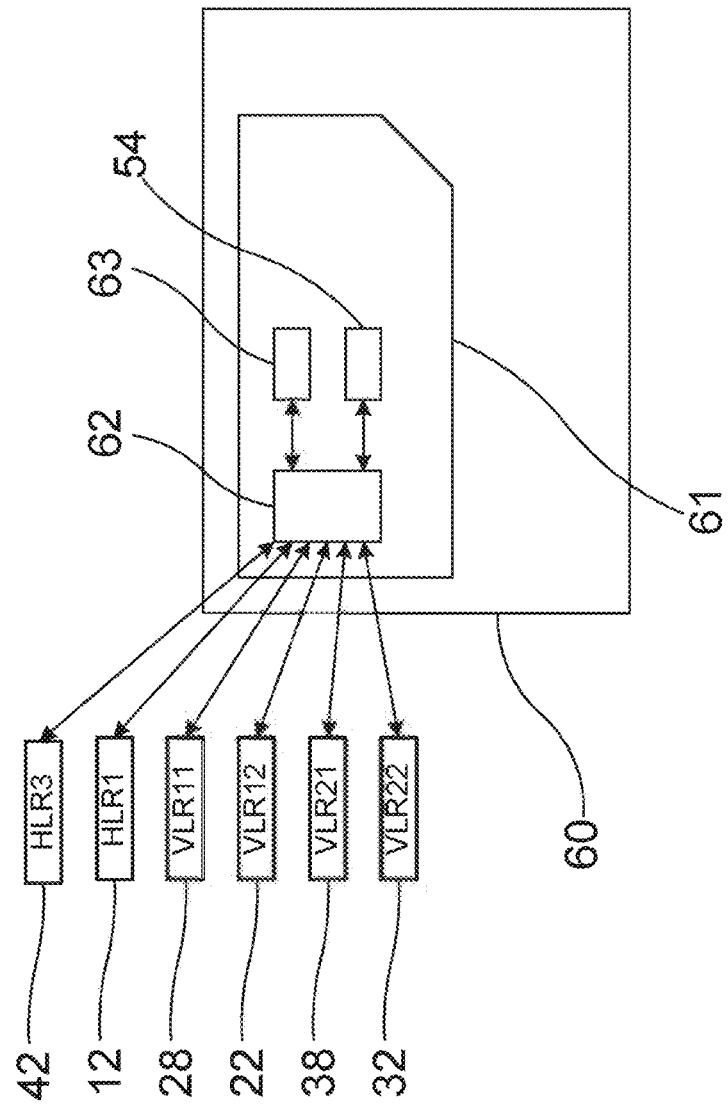
FIG. 4 is a simplified overview diagram of a mobile device having a SIM card according to the present invention.

FIG. 4 illustrates an exemplifying mobile device 60, comprising a SIM card 61 installed in the mobile device 60. FIG. 4 is heavily simplified, and does not, for example, show communication paths between the mobile phone 60 and the SIM card 61; the radio antenna of the mobile phone 60 via which all communication between the SIM card 61 and the external world takes place; etc., but is only intended to illustrate the principles of the present invention.

The SIM card 61 comprises a SIM card software application module 62, which is as described above, and which is connected to two IMSI memory places 63, 64. Naturally, there may be more than two IMSI memory places. An example of the function of the SIM card 61, including the software application 62, according to the present invention is the following.

First, a home IMSI is installed in the memory space 63 and used for network identification in the home network 10.

When the mobile device roams to the first visited network 26, an instruction message is sent from the HLR 12 and is received by the SIM card 61, whereupon the software application 62 replaces the home IMSI with the first visited country IMSI in the memory space 63 for use as network identification, as a local subscriber, in the first collaborating network 20, and the home IMSI is instead saved in the memory position 44 for later use. Then the software application 62 performs a device network refresh.

When the mobile phone thereafter roams from the first collaborating network 20 to the second visited network 36, the software application 62 detects this roaming event, since it monitors the country codes of the currently connected network. Hence, it shifts the home IMSI back to the memory position 63 for use as network identification. Then, it performs a device network refresh. This will result, via a location update message from VLR21 38 to HLR1 12, in that the SIM card 41 receives a message to again change the IMSI used for network identification to a second visited country IMSI. Upon receipt of this message, the software application 62 stores the second visited country IMSI in memory location 63 for use as network identification, and again saves the home IMSI in memory location 64. Thereafter the application 62 performs a device network refresh.

When the mobile phone roams back to the home network 10, the software application 62 again recognizes this, as a consequence of its country code monitoring, and as a result reinstalls the home IMSI in the memory position 63 for use as network identification. It then performs a device network refresh.

In practice, the message sent over the air from the HLR1 12 to the mobile device 60 to change the IMSI, may include instructions to write a new EF_IMSI, to delete the current IMSI from EF_LOCI, and then to perform a network refresh.

The software application 62 may, in practice, comprise the following logic for use when roaming into one country from another: If the last visited country was the home country 3, then save the current country as the last visited country and back up related information (LOCI, LOCIGPRS, PSLOCI, FPLMN, etc.) as the last used home info. If the last visited country, on the other hand, was not the home country 3, then save the current country as the last visited country and reset related information (IMSI, Ki, OPC, LOCI, LOCIGPRS, PSLOCI, FPLMN, etc.) to the last used home info and try to connect to an available network.

Above, preferred embodiments have been described. However, it is apparent to the skilled person that many modifications may be made to the described embodiments without departing from the basic thought of the invention.

For instance, as long as the signaling traffic is routed via the Internet 6 rather than via the conventional PSTN 1, the data traffic resulting from the Internet connection of the mobile device can be routed in any way, such as directly via an Internet tunnel and not using GRX 2.

The basic idea to route signaling traffic over the Internet using a central ITP appliance according to the present invention is also useful even if not switching IMSI codes upon roaming into a visited network as described above.

Furthermore, the HLR2 18 and HLR4 38 may be connected to both home network 10 and home network 40. Specifically, ITP5 may be connected to a central HLR in country 50, which central HLR in that case comprises the HLR2 18 and HLR4 48 functions as well. The corresponding may then be true regarding IMSIDB2 18*a* and IMSIDB3 48*a*. This way, one single geographical central location in one country can accommodate all distributed network logic, only requiring simple ITP appliances in each respective connected country.

Thus, the invention shall not be limited to the described embodiments, but may be varied within the scope of the enclosed claims.

The invention claimed is:

1. A method for routing mobile phone signaling messages between different mobile communication networks, which networks are interconnected by a Public Switched Telephone Network (PSTN) operated by one or several PSTN operators, via which PSTN telephone signaling can be performed during roaming using a telephony signaling protocol, where at least one collaborating network comprises a respective Signal Transfer Point (STP) and at least two home networks comprise a respective STP each, the method comprising the steps of:

a) connecting a respective collaborating internet Transfer Point (ITP) to the STP of each respective collaborating network, connecting a respective home ITP to the STP of each respective home network, providing a central ITP which is connected to each of the other ITP:s via the internet, and providing a server comprising a Home Location Registry (HLR) in connection to, but arranged externally to, one of said home networks;

b) providing a visited country International Mobile Subscriber Identity (IMSI), identifying a mobile subscriber as a subscriber to a certain one of said collaborating networks;

c) to the central ITP, providing an association between the visited country IMSI and one of the said home networks;

d) causing the STP of the certain one collaborating network to send a first signaling message comprising the visited country IMSI, based upon this IMSI, to the respective collaborating ITP;

e) causing the collaborating ITP to forward, via the internet, all signaling messages received from the STP of the certain one collaborating network, including the said first signaling message, to the central ITP;

f) forwarding, via the internet, the first signaling message from the central ITP to the respective home ITP connected to the STP of the home network with which the visited country IMSI is associated and based upon the association provided in step c);

g) sending the first signaling message from the said home ITP to the STP of the said home network;

h) causing the STP of the said home network to forward the first message to the said HLR;

i) sending a second signaling message, comprising the visited country IMSI, from the HLR to the STP of the home network to which the HLR is connected;

j) sending the second signaling message from the STP of said home network to the home ITP;

k) causing the said home ITP to forward, via the internet, all signaling messages received from the STP of the home network, including the said second signaling message, to the central ITP;

l) forwarding, via the internet and based upon the visited country IMSI, the second signaling message from the central ITP to the respective collaborating ITP connected to the STP of the collaborating network to which the mobile subscriber is identified as a subscriber by the visited country IMSI; and m) sending the second signaling message from the said collaborating ITP to the STP connected to the said ITP.

2. The method according to claim 1, wherein a mobile communication device roams between a certain first of said home networks in a home country and a certain first of said collaborating networks in a visited country, which first home network and first collaborating network are interconnected by a PSTN operated by one or several PSTN operators, via which PSTN telephone signaling can be performed during roaming using a telephony signaling protocol, wherein the mobile communication device comprises a Subscriber Identity Module card identifying itself to each network using a first visited country IMSI which identifies the mobile device comprising the SIM card as a subscriber to the first collaborating network, and wherein the signaling message in step d) is a location update message which is sent as a consequence of a location update procedure initiated in relation to the mobile device when the mobile device is located within the coverage area of the first collaborating network.

3. The method according to claim 2, wherein, in an initial step performed before step d), the SIM card is provided with a home IMSI associated with the first home network, wherein, after or in connection to the mobile device moving from the coverage area of the first home network to the coverage area of a first visited network a location update procedure is initiated, wherein, triggered by the location update message, an instruction message is sent over the air to the mobile device to change, to the first visited country IMSI, the IMSI used for network identification of the SIM card, wherein the mobile device then stores the first visited country IMSI on the SIM card and uses it for network identification of the SIM card.

4. The method according to claim 3, wherein the method comprises the additional steps of causing the mobile device to store an Access Point Name (APN) identifying a Gateway GPRS Support Node (GGSN) in the first home network, and, upon a data connection attempt by the mobile device using the APN, setting up an Internet data connection to the mobile device via the GGSN and an Serving GPRS Support Node (SGSN) in the first collaborating network.

5. The method according to claim 3, wherein, upon roaming from the coverage area of the first collaborating network to the coverage area of a second visited network in a second visited country, the mobile device is caused to change the IMSI used for network identification of the SIM card back to the home IMSI and then to perform a device network refresh, wherein, triggered by a location update message resulting from the change of IMSI used for network identification and received by the first home network, an instruction message thereafter is sent over the air to the mobile device to change, to a second visited country IMSI which is associated with a second collaborating mobile communication network in the second visited country, the IMSI used for network identification of the SIM card, and wherein the method is then resumed from step d), but with the second collaborating network instead of first collaborating network and the second visiting country IMSI instead of the first visiting country IMSI.

6. The method according to claim 1, wherein the visited country IMSI is not modified.

7. The method according to claim 1, wherein the first and/or second visited country IMSI codes are caused to belong to a respective plurality of IMSI codes, which plurality is stored by the HLR, associated with a respective visited country and caused to contain less individual IMSI codes than the total number of users of the method, and wherein all IMSI codes in said plurality are caused to be associated with a HLR of the respective collaborating network in the respective visited country.

8. The method according to claim 1, wherein the visited country IMSI is caused to be associated with a setting in the respective HLR with which the IMSI in question is associated making available data communication but not voice communication when roaming of the mobile device.

9. The method according to claim 8, wherein the data communication to and from the mobile device when being served by a collaborating network is in the form of Internet access, and is passed on to the home network using a roaming exchange or an Internet tunnel.

10. The method according to claim 1, wherein a respective ITP is arranged in each of a plurality of countries and arranged to forward all signaling messages received from one or several STP:s located in the same respective country to the central ITP.

11. A distributed network system for routing mobile phone signaling messages between different mobile communication networks, which networks are interconnected by a Public Switched Telephone Network (PSTN) operated by one or several PSTN operators, via which PSTN telephone signaling can be performed during roaming using a telephony signaling protocol, where at least one collaborating network comprises a respective Signal Transfer Point (STP) and at least two home networks comprise a respective STP each, the system comprising:

a respective collaborating Internet Transfer Point (ITP) connected to the STP of each respective collaborating network;

a respective home ITP connected to the STP of each respective home network;

a central ITP connected to each of the said other ITP:s using the internet; and a server comprising a Home Location Registry (HLR) in connection to, but arranged externally to, one of said home networks, wherein the collaborating ITP connected to a certain one of the collaborating networks is arranged to forward, via the internet, to the central ITP, all signaling messages sent from the STP of the certain collaborating network to the collaborating ITP, including a first such signaling message, which first signaling message comprises a visited country International Mobile Subscriber Identity (IMSI) identifying a mobile subscriber as a subscriber to the certain collaborating network, wherein the central ITP is arranged to in turn forward, via the internet, the first signaling message to the respective home ITP connected to the STP of a home network with which the visited country IMSI has previously been associated in the central ITP, based upon such association, wherein the said home ITP is arranged to then send the first signaling message to the STP of the said home network, wherein said HLR is arranged to receive the first message, from the STP of the said home network and to send a second signaling message, comprising the visited country IMSI, to the STP of the home network, wherein the home ITP connected to the STP of the home network to which the HLR is connected is arranged to receive the second signaling message from the said STP and to forward, via the internet, all signaling messages received from said STP, including the second signaling message, to the central ITP, wherein the central ITP is arranged to in turn forward, via the Internet and based upon the visited country IMSI, the second signaling message to the respective collaborating ITP connected to the STP of the collaborating network to which the mobile subscriber is identified as a subscriber by the visited country IMSI, and wherein the said collaborating ITP is arranged to send the second signaling message to the STP connected to said ITP.

12. The system according to claim 11, wherein the HLR comprises or is associated with a set of IMSI codes which are arranged to identify a mobile subscriber as a subscriber to the certain one first collaborating network.

13. The system according to claim 12, wherein the HLR comprises or is associated with one respective set of IMSI codes for at least two of the collaborating networks, which IMSI codes are arranged to identify a mobile subscriber as a subscriber to the respective collaborating network.

14. The system according to claim 11, wherein the system comprises a respective ITP arranged in each of a plurality of countries, where each such ITP is arranged to forward all signaling messages received from one or several STP:s located in the same respective country to the central ITP.

* * * * *